US006948772B1

(12) United States Patent
Robinson et al.

(10) Patent No.: US 6,948,772 B1
(45) Date of Patent: Sep. 27, 2005

(54) LINEAR SEAT RECLINER FOR STRUCTURAL SEAT

(75) Inventors: David L. Robinson, Sterling Heights, MI (US); John F. Whalen, Macomb, MI (US); Jeffery T. Bonk, Clinton Township, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 619 days.

(21) Appl. No.: 09/518,120

(22) Filed: Mar. 3, 2000

(51) Int. Cl.[7] .................................................. B60N 2/02
(52) U.S. Cl. .................. 297/362.12; 297/363; 297/364
(58) Field of Search ........................... 297/362.12, 363, 297/364, 375

(56) References Cited

U.S. PATENT DOCUMENTS

| | | | | | |
|---|---|---|---|---|---|
| 1,982,352 | A | * | 11/1934 | Richardson | 72/378 |
| 2,369,076 | A | * | 2/1945 | Schmued | 297/284.1 |
| 3,328,076 | A | * | 6/1967 | Naef | 297/363 |
| 3,356,411 | A | * | 12/1967 | Homier et al. | 297/362.12 |
| 4,898,424 | A | | 2/1990 | Bell | |
| 5,299,853 | A | * | 4/1994 | Griswold et al. | 297/362.12 |
| 5,344,215 | A | * | 9/1994 | Dahlbacka | 297/375 |
| 5,618,083 | A | * | 4/1997 | Martone et al. | 297/375 |
| 5,660,440 | A | | 8/1997 | Pejathaya | |
| 5,685,603 | A | * | 11/1997 | Lane, Jr. | 297/216.11 |
| 5,718,482 | A | | 2/1998 | Robinson | |
| 5,769,493 | A | | 6/1998 | Pejathaya | |
| 5,823,622 | A | | 10/1998 | Fisher, IV et al. | |
| 5,918,939 | A | * | 7/1999 | Magadanz | 297/378.12 |
| 5,947,560 | A | * | 9/1999 | Chen | 297/362.12 |
| 5,979,986 | A | | 11/1999 | Pejathaya | |
| 5,984,412 | A | | 11/1999 | Magyar | |
| 6,017,090 | A | * | 1/2000 | Bonk | 297/362.12 |
| 6,039,399 | A | | 3/2000 | Whalen et al. | |
| 6,095,609 | A | * | 8/2000 | Magadanz | 297/378.12 |

* cited by examiner

*Primary Examiner*—Peter M. Cuomo
*Assistant Examiner*—Joe Edell
(74) *Attorney, Agent, or Firm*—Harness, Dickey & Pierce, P.L.C.

(57) ABSTRACT

A linear seat recliner for use in a motor vehicle having a seat with a seat back pivotally connected to a seat bottom. The seat is operable in a plurality of use positions ranging from an upright position to a fully reclined position. The linear seat recliner includes a housing adapted to be coupled to one of the seat back and the seat bottom, a latching mechanism coupled to the housing, and a recliner rod. The recliner rod includes a body having a first end and a second end. The body has a substantially planar top flat diametrically opposed and parallel to a substantially planar bottom flat. The top flat includes a plurality of teeth positioned at the first end of the body. The first end of the recliner rod is selectively engageable by the latching mechanism and the second end of the recliner rod is adapted to be coupled to the other of the seat back and the seat bottom.

16 Claims, 5 Drawing Sheets

LINEAR SEAT RECLINER FOR STRUCTURAL SEAT

BACKGROUND OF THE INVENTION

1. Technical Field

The present invention generally pertains to a seat for a motor vehicle and, more particularly, to a linear seat recliner for a motor vehicle passenger seat.

2. Discussion

Most motor vehicles are equipped with seats having a seat bottom, a seat back pivotally secured to the seat bottom and a recliner mechanism for latching the seat back in a desired use position relative to the seat bottom. Generally, the recliner mechanism may be selectively actuated for adjusting the angularity of the seat back relative to the seat bottom through a range of use positions defined between an upright position and a fully reclined position. One type of recliner mechanism, referred to as a linear seat recliner, typically includes a housing and an elongated recliner rod having a first end supported by the housing. The housing is adapted to be mounted to the seat bottom frame and the second end of the recliner rod is pivotally secured to a lever arm extension of the seat back frame. A latch assembly normally functions to latch the first end of the recliner rod to the housing. Upon release of the latch assembly, linear movement of the recliner rod relative to the housing results in angular movement of the seat back relative to the seat bottom.

Conventionally, the recliner rod is constructed from a generally cylindrical smooth rod having a circular cross section. A portion of the rod is subsequently machined to include a plurality of teeth spaced along the recliner rod. Standard manufacturing techniques such as broaching require the recliner rod to be fixed while the teeth are machined. Unfortunately, the use of a generally cylindrical recliner rod make it difficult to properly form teeth on the rod. Specifically, the round rod has a tendency to rotate during machining making it difficult to properly align the teeth on the rod. Alternatively, the smooth cylindrical rod is commonly first machined to provide a planar segment and then broached in order to produce a suitable tooth width. Accordingly, it would be desirable to construct a linear seat recliner having a recliner rod with an economically manufactured, properly formed set of teeth.

In addition, many linear recliner mechanisms utilize a stop radially protruding from an end of the recliner rod in order to limit the travel of the rod in relation to the housing. While the stop is useful in limiting the travel of the seat back relative to the seat bottom, it is time consuming and therefore costly to manufacture and attach a separate stop to a recliner rod. Therefore, it would be advantageous to design a recliner rod that is capable of providing an integral stop for minimal cost.

Lastly, some recliner mechanisms do not function properly as a result of binding of the recliner rod with the mating components. These recliner rods are typically not well supported within the housing and may excessively bend due to input loading. Accordingly, a guided recliner rod with an increased resistance to bending would be a welcome improvement.

SUMMARY OF THE INVENTION

Accordingly, it is an object of the present invention to provide a linear seat recliner including a recliner rod having parallel top and bottom faces extending substantially between first and second rod ends.

It is another object of the present invention to provide a recliner rod which is adapted to accommodate the formation of axially spaced pawl engagement teeth along a portion of the length of the rod.

It is yet another object of the present invention to provide a recliner rod having improved bending load resistance.

It is an additional object of the present invention to provide a recliner rod having an integral stop.

The present invention includes a linear seat recliner for use in a motor vehicle having a seat with a seat back pivotally connected to a seat bottom. The seat is operable in a plurality of use positions ranging from an upright position to a fully reclined position. The linear seat recliner includes a housing adapted to be coupled to one of the seat back and the seat bottom, a latching mechanism coupled to said housing, and a recliner rod. The recliner rod includes a body having a first end and a second end. The body has a substantially planar top flat diametrically opposed and parallel to a substantially planar bottom flat. The top flat includes a plurality of teeth positioned at the first end of the body. The first end of the recliner rod selectively engages the latching mechanism and the second end of the recliner rod is adapted to be coupled to the other of the seat back and the seat bottom.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
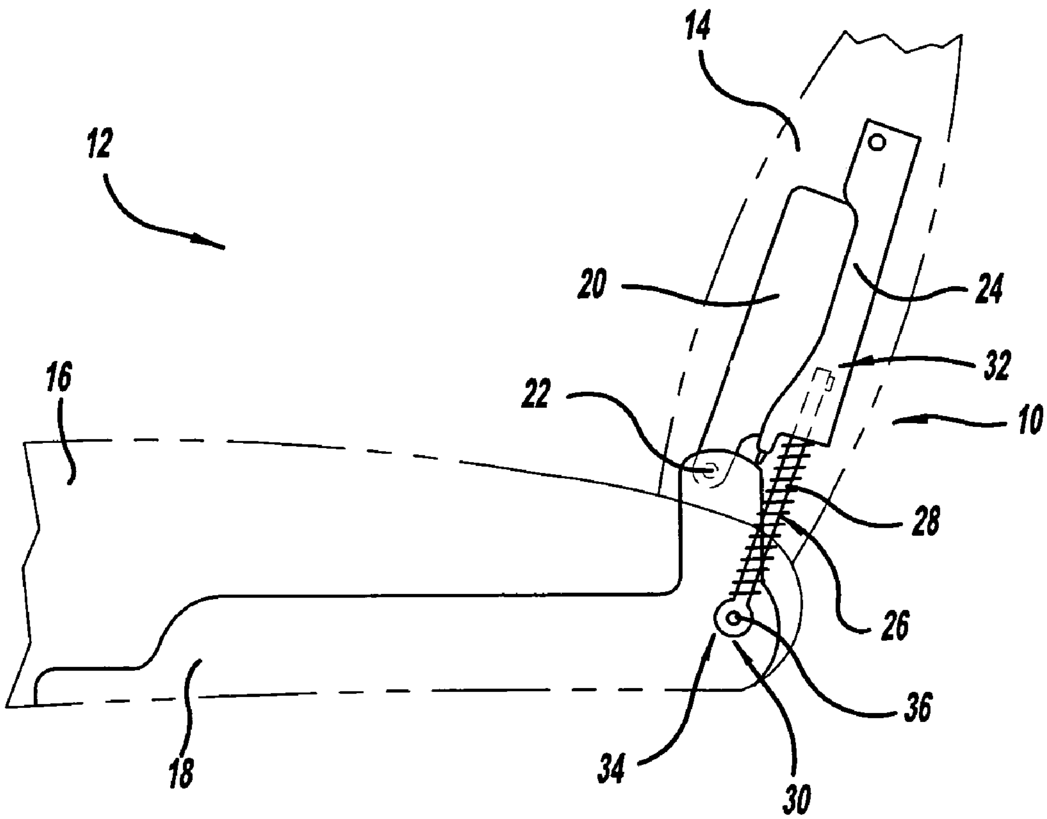
FIG. 1 is a side elevational view of a vehicle seat showing the linear seat recliner of the present invention located along an outer edge of the seat frame.

With initial reference to FIG. 1, a linear seat recliner for a motor vehicle seat constructed in accordance with the teachings of the present invention is generally identified at reference numeral 10. The linear seat recliner 10 is shown operatively associated with a seat assembly 12 having a seat back 14 and a seat bottom 16. While not limited thereto, the seat assembly 12 is of a type contemplated for use as a front seat of a motor vehicle.

The seat assembly 12 has an underlying frame structure including a pair of lateral side rails 18 which support the seat bottom 16 and a pair of lateral support rails 20 which support the seat back 14. The lateral support rails 20 are pivotally coupled at pivots 22 to the lateral side rails 18. As such, the seat back 14 is supported for angular movement relative to the seat bottom 16. However, those skilled in the art will appreciate that the linear seat recliner 10 can be installed in virtually any seat application where reclining and/or forward dumping of the seat back 14 is required. For example, the seat assembly 12 can be used with a seat having a separate restraint system as well as an "all-belts-to seat" type (i.e., stand-alone structural seat). The linear seat recliner 10 is preferably located on the outboard lateral side of the seat assembly 12 to permit convenient actuation of its reclining and dumping features.

The preferred embodiment of the linear seat recliner 10 of the present invention utilizes one of the lateral support rails 20 as a housing for mounting components which will be described in greater detail hereinafter. However, one skilled in the art will appreciate that the linear seat recliner 10 may alternatively include a housing 24 that is adapted to be secured to one of the lateral support rails 20. Accordingly, the housing 24 may be integral with or separate from one of the lateral support rails 20.

While the housing 24 is shown in FIG. 1 as being mounted to the seat back 14, those skilled in the art will appreciate that the linear seat recliner 10 can alternatively be located in the seat bottom 16 of the seat assembly 12. Specifically, the housing 24 may be mounted to one of the lateral side rails 18 with the second end 34 of the recliner rod 28 attached to the seat back 14. In all other aspects, the linear seat recliner 10 operates in the same manner regardless of its mounting location in the seat bottom 16 or the seat back 14.

The linear seat recliner 10 further includes a recliner rod assembly 26 comprised of an elongated recliner rod 28 and a ball joint 30. The recliner rod 28 has a first end 32 (FIG. 2) supported by the housing 24 for linear movement relative thereto and a second end 34 pivotally coupled to one of the lateral side rails 18 by a hinge pin 36 (FIG. 1). In general, the linear seat recliner 10 is operable for permitting selective adjustment of the angularity of the seat back 14 relative to the seat bottom 16 through a range of use positions between an upright position and a fully reclined position. As a further option, the linear seat recliner 10 may be operable to permit the seat back 14 to be folded to a forward dumped position to provide clear access to the area located behind the seat assembly 12.

Figure 2:
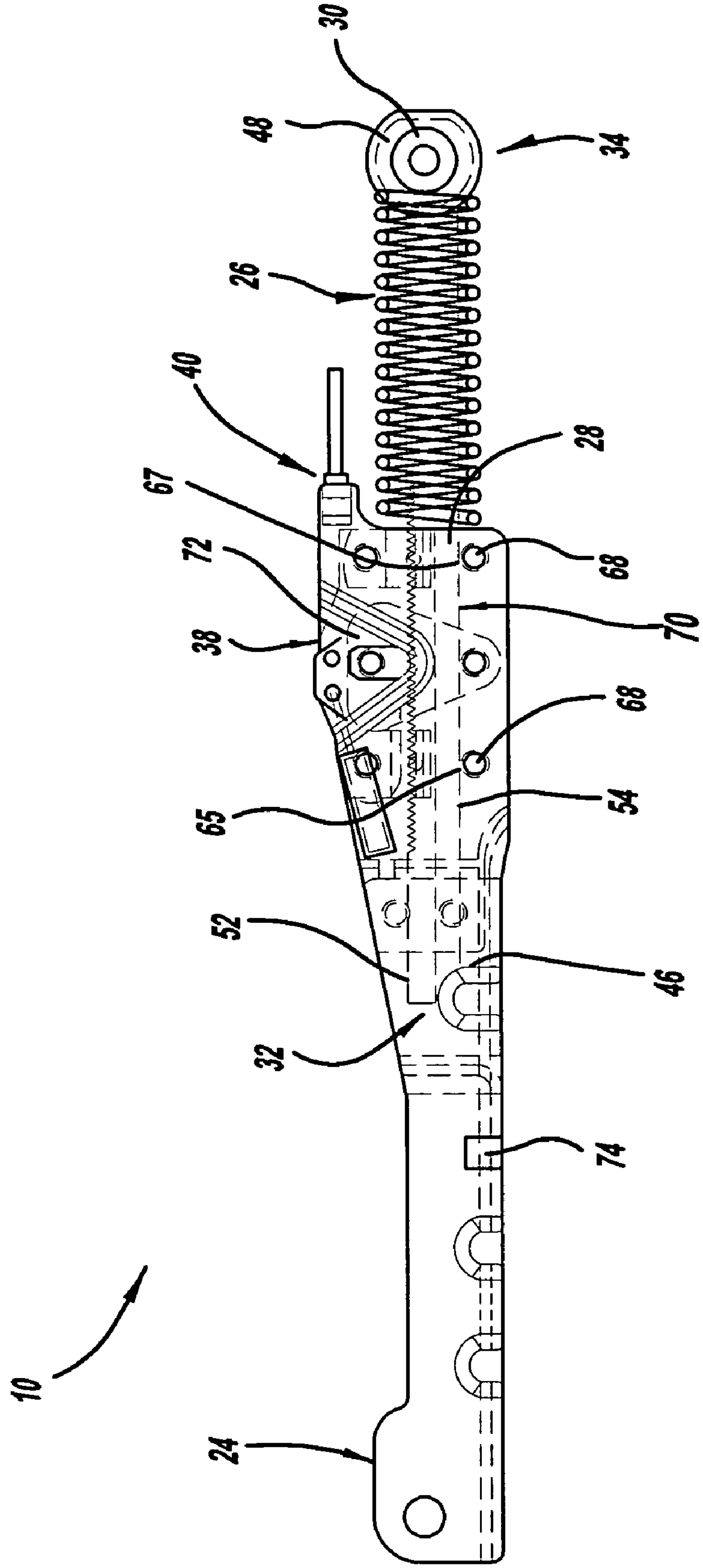
FIG. 2 is a side elevational view of the linear seat recliner constructed in accordance with the teachings of the present invention.

As shown in FIG. 2, the linear seat recliner 10 includes a latching mechanism 38 operable for releasable latching the first end 32 of the recliner rod 28 to the housing 24. The latching mechanism 38 is normally operable in a locked mode to prevent movement of the recliner rod 28 relative to the housing 24 for securing the seat back 14 in a desired use position. The latching mechanism 38 is further operable in a released mode to release the first end 32 of the recliner rod 28 for linear movement relative to the housing 24, thereby permitting adjustment of the use position of the seat back 14.

A recline actuator mechanism 40 is provided to permit a seat occupant to selectively shift the latching mechanism 38 from its locked mode into its released mode when it is desired to adjust the seat back position. The linear seat recliner 10 may further include a memory dump mechanism (not shown) for causing the latching mechanism 38 to release the seat back 14 for pivotal movement from its use position to its forward dumped position and then automatically re-latch the seat back 14 in its previous use position, and a dump actuator mechanism for controlling actuation of the memory dump mechanism. A detailed discussion of exemplary latching, recliner actuator, and memory dump mechanisms is contained in commonly owned U.S. Pat. No. 5,769,493 entitled "Linear Recliner With Easy Entry Memory Feature," the disclosure of which is hereby expressly incorporated by reference.

Figure 3:
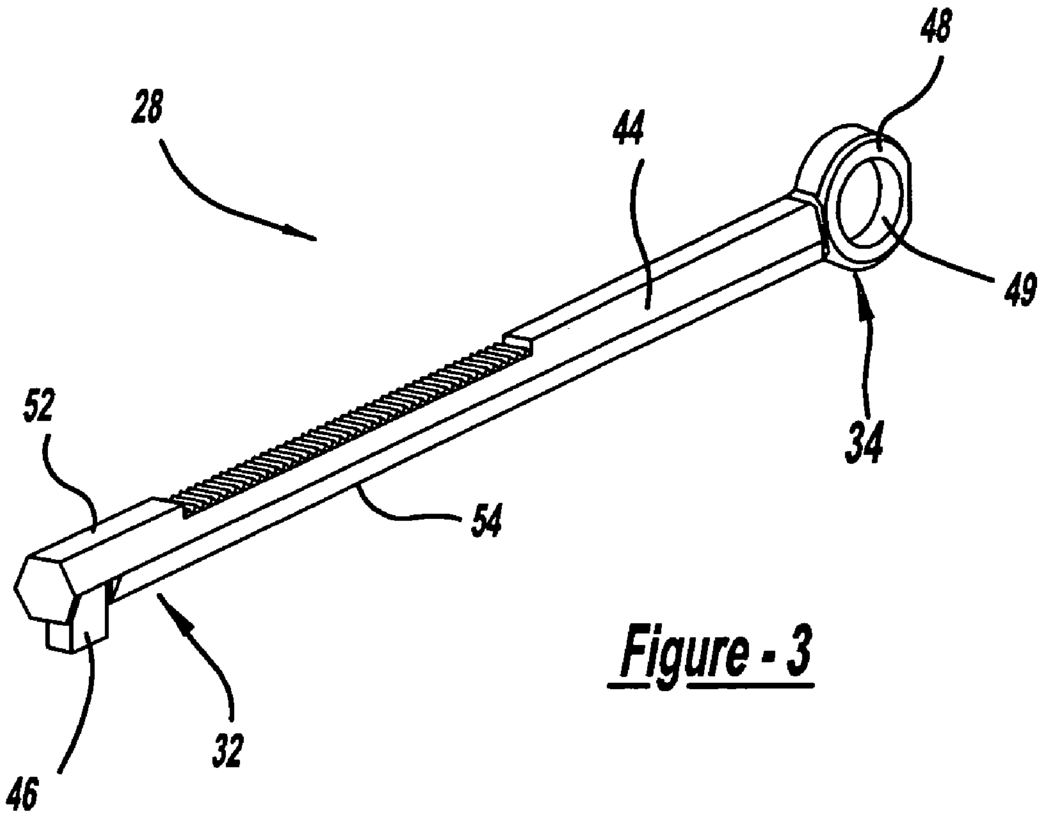
FIG. 3 is a perspective view of a recliner rod constructed in accordance with the teachings of the present invention.

In general, the linear seat recliner 10 includes a recliner rod 28 having improved bending load limits and that is more efficiently guided during movement relative to the housing 24. In addition, the present invention aids in the manufacture of the linear seat recliner 10, specifically, the recliner rod 28. In this regard and with reference to FIG. 3, the recliner rod 28 includes a hexagonally shaped body 44 with first end 32 and second end 34. A stop 46 extends radially from the first end 32 of the recliner rod 28 for limiting the translation of the recliner rod 28 in the housing 24 as described in greater detail hereinafter. The stop 46 is an integral feature of the recliner rod 28. Specifically, the radially extending stop 46 is preferably created by mechanically deforming the first end 32 of the recliner rod 28 through an operation such as staking or swaging.

The recliner rod 28 also includes a paddle 48 positioned at the second end 34 of the recliner rod 28. The paddle 48 includes an aperture 49 for receipt of the ball joint 30 (FIG. 1). One skilled in the art will appreciate that the paddle 48 may also be cold formed as an integral component of the recliner rod 28.

The recliner rod 28 further includes a plurality of gear teeth 50 axially spaced along a first flat 52 of the hexagonally shaped body 44. During manufacture of the gear teeth, alignment of the recliner rod 28 relative to the broach or other gear cutting tool is critical to the proper formation and alignment of engagement teeth 50. Accordingly, the recliner rod 28 of the present invention includes two diametrically opposed, parallel flats 52 and 54, extending substantially the entire length of the recliner rod 28. The parallel flats 52 and 54 greatly enhance the manufacturability of the teeth 50. Specifically, the flat 54 acts as a datum plane for aligning the recliner rod 28 with the machine tool used to create the engagement teeth 50. In the preferred embodiment, the hexagonally shaped body 44 has three sets of diametrically opposed parallel flats to ease the task of fixturing and retaining the recliner rod 28 as the teeth 50 are machined.

Figure 5:
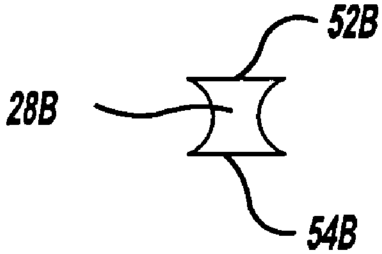
FIG. 5 is a cross sectional view of another alternate recliner rod configuration.
Figure 4:
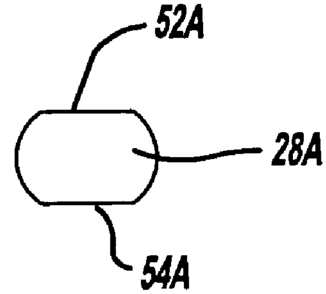
FIG. 4 is a cross sectional view of an alternate recliner rod configuration.

One skilled in the art will appreciate that other geometrical cross sections may be implemented which do not depart from the scope of the present invention as defined by the appended claims. For example, FIG. 4 represents a cross section of a recliner rod 28A having only two flats 52A and 54A, respectively. The flats may be constructed using a variety of methods such as coining a round rod or simply extruding the shape directly from a die. Similarly, FIG. 5 is a representation of the cross section of a recliner rod 28B having first and second flats 52B and 54B, respectively. The recliner rod 28B is an example of a rod exhibiting a high bending strength in combination with a low weight due to the modified I-beam configuration.

Figure 6:
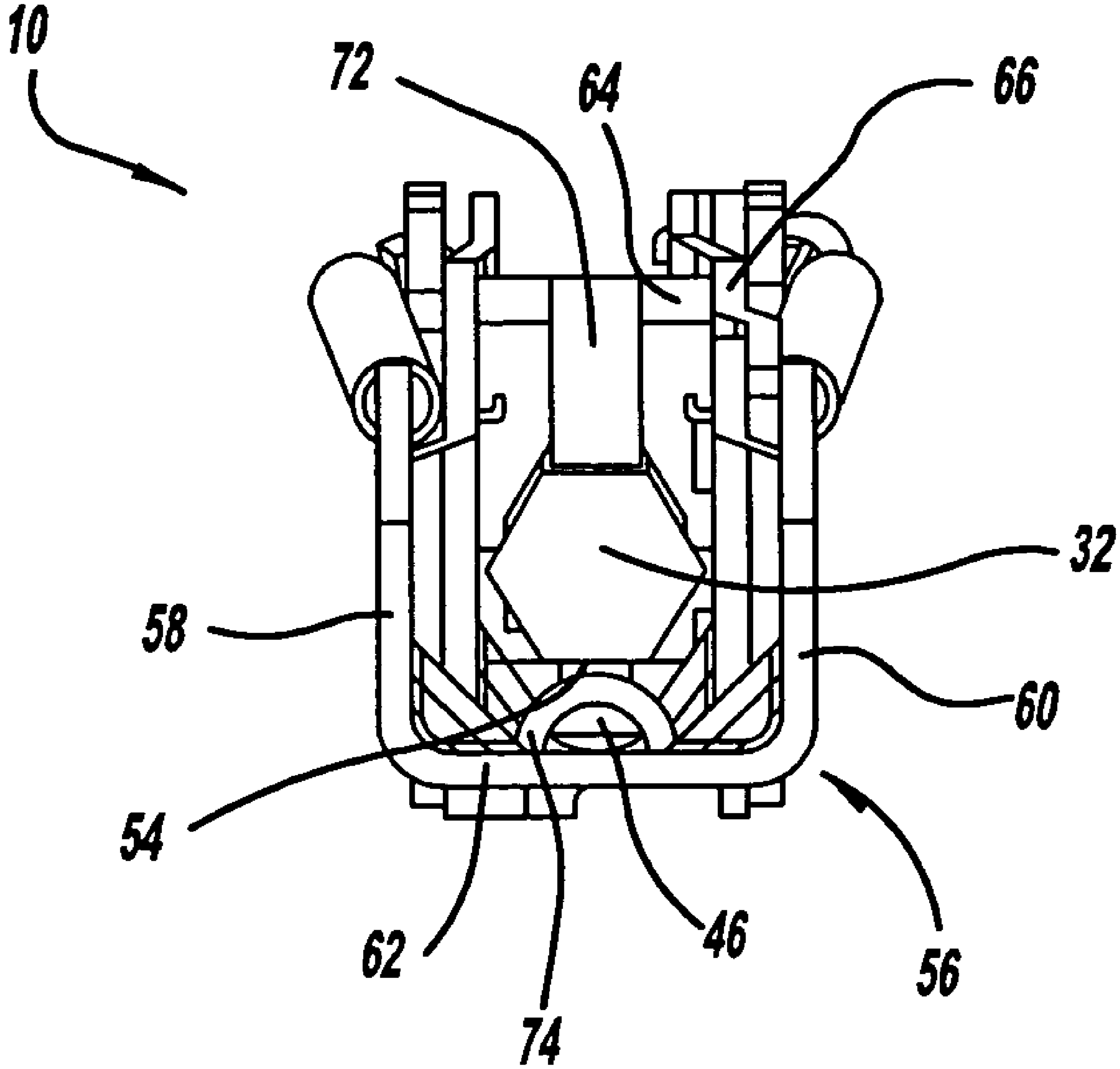
FIG. 6 is a front elevational view of the linear seat recliner shown in FIG. 2.
Figure 7:
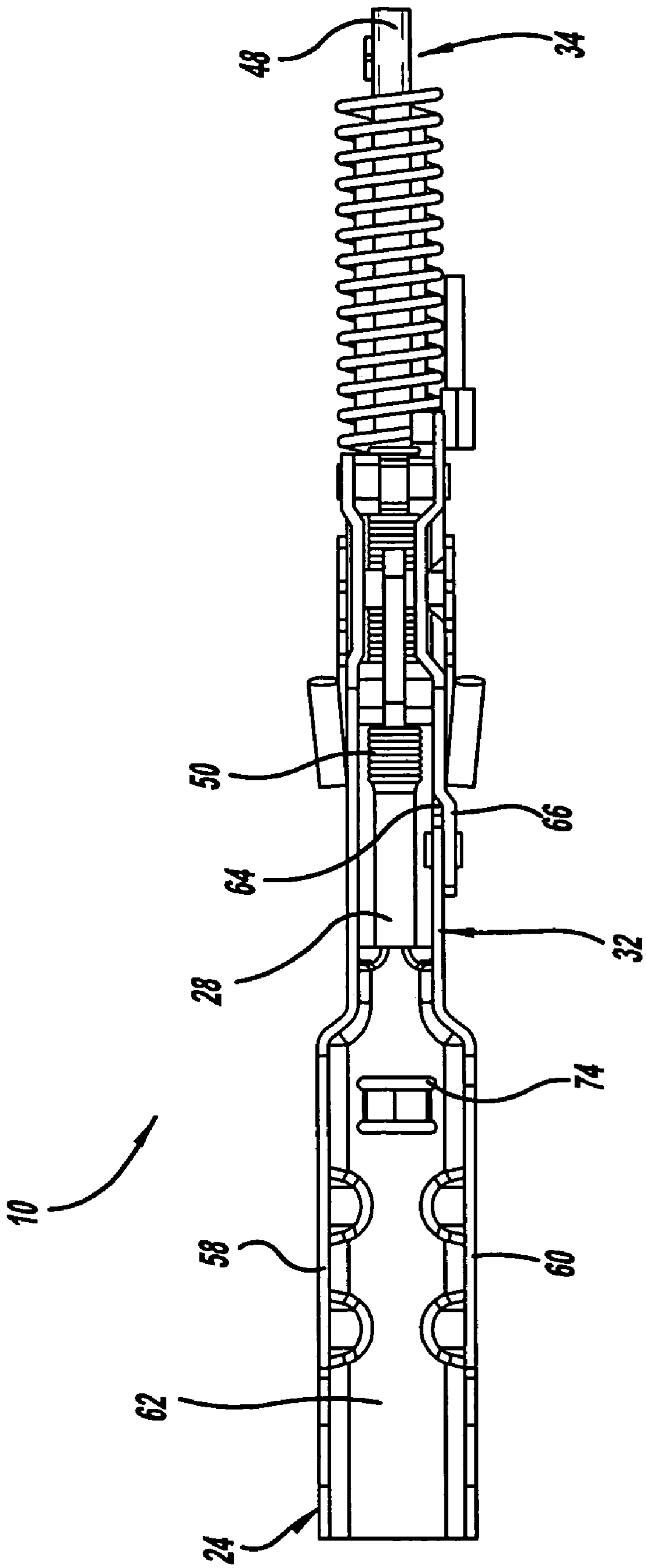
FIG. 7 is a top elevational view of the linear seat recliner shown in FIG. 2.

With reference to FIGS. 6 and 7, the housing 24 includes a generally U-shaped channel 56 having a first side wall 58 and a second side wall 60 interconnected by an end wall 62. The first side wall 58 extends substantially the full length of the housing 24 while the second side wall 60 extends only a portion of the length to define an installation aperture 64. The installation aperture 64 is sufficiently sized to allow insertion of the latching mechanism 38 within the U-shaped channel 56. Once the latching mechanism 38 has been properly positioned, an access plate 66 is riveted to the second side wall 60 of the housing 24. Referring to FIG. 2, the upper tangential surfaces 65 and 67 of at least two of the lower rivets 68 define a guide plane 70 on which the second flat 54 of the recliner rod 28 is supported. The second flat 54 provides a substantial contact area for engagement with the rivets 68, thereby reducing the bending stresses within the recliner rod 28 during operation. One skilled in the art will appreciate that the rivets 68 may include bearings (not shown) to further assist the motion of the recliner rod 28.

The second flat 54 also acts to align the teeth 50 with the latching mechanism 38. Specifically, both the recliner rod 28 and the latching mechanism 38 are positioned relative to a common datum, the first and second sidewalls 58 and 60. The latching mechanism 38 includes a pawl 72 for releasable engagement with the teeth 50. Because the latching mechanism is secured to one or both of the sidewalls, the pawl 72 is maintained substantially parallel to the first and second sidewalls. Similarly, the second flat 54B engages the rivets 68 to maintain the recliner rod in perpendicular relation to the first and second sidewalls 58 and 60 of the housing 24. As such, the use of opposed flats 52B and 54B during machining of teeth 50 and assembly of the rod within the housing 24 assures proper tooth alignment with the pawl 72 and the latching mechanism 38.

Referring to FIG. 6, the housing 24 includes a barb 74 protruding inwardly from the end wall 62. The barb 74 acts in cooperation with the stop 46 to limit the distance that the second rod end 34 may be displaced away from the housing 24. Therefore, the position of the stop 46 relative to the barb 74 defines the fully reclined position of the seat assembly 12.

Accordingly, it should be appreciated that the configuration and operation of the linear seat recliner 10 provides both manufacturing and functional advantages over the prior art. Specifically, the recliner rod of the present invention exhibits an improved bending load limit, includes top and bottom flats for improved guidance and manufacturability, and also includes an integral paddle and stop.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed is:

1. A linear seat recliner for use in a motor vehicle having a seat with a seat back pivotally connected to a seat bottom, the seat being operable in a plurality of use positions ranging from an upright position to a fully reclined position, the linear seat recliner comprising:

- a housing adapted to be coupled to one of the seat back and the seat bottom;
- a latching mechanism coupled to said housing and actuable relative said housing between a latched position and an unlatched position; and
- a recliner rod including a body having at least three pairs of substantially planar diametrically opposed and parallel flats, a top flat including a plurality of teeth positioned at said first end of said body, and a stop formed from a plurality of said flats, said plurality of teeth of said recliner rod selectively engaged with said latching mechanism.

2. The linear seat recliner of claim 1 wherein said recliner rod is adapted for sliding from a first position corresponding to the fully reclined position to a second position corresponding to the upright position, said stop engaging said housing when said recliner rod is in said first position.

3. The linear seat recliner of claim 1 wherein said stop is integrally formed in said recliner rod and orthogonally extends from a bottom flat that is diametrically opposed and parallel to said top flat.

4. The linear seat recliner of claim 1 wherein said body of said recliner rod has a hexagonal cross section.

5. The linear seat recliner of claim 1 wherein said housing includes a guide mechanism supporting a bottom flat of said recliner rod.

6. The linear seat recliner of claim 1 wherein said flats extend substantially between said first and second ends.

7. A reclining seat assembly comprising:

- a seat bottom having a side rail;
- a seat back having a support rail pivotally coupled to said side rail;
- a linear seat recliner including a housing secured to said support rail;
- a recliner rod having a first end supported for relative linear motion within said housing and a second end having an aperture, said recliner rod having at least three pairs of substantially planar diametrically opposed and parallel flats, a top flat having a plurality of teeth formed therein and a substantially planar bottom flat positioned parallel thereto and having a stop formed therein, said second end pivotally coupled to said side rail; and
- a latching mechanism coupled to said housing and actuable relative said housing between a latched position where said latching mechanism engages said teeth to prevent relative axial movement of said recliner rod and an unlatched position where said latching mechanism allows relative axial movement of said recliner rod.

8. The reclining seat assembly of claim 7 wherein said stop radially protrudes from said bottom flat for restricting the linear motion of said recliner rod relative to said housing.

9. The reclining seat assembly of claim 8 wherein said bottom flat is diametrically opposed and parallel to said top flat.

10. A recliner rod for a linear seat recliner for use in a seat having a seat back pivotally connected to a seat bottom, the seat operable in a plurality of use positions ranging from an upright position to a fully reclined position, the linear seat recliner having a housing coupled to one of the seat back and the seat bottom, the linear recliner mechanism also having a latching mechanism coupled to the housing, the recliner rod comprising:

- a body having a first end and a second end, said body further having at least three pairs of diametrically opposed and substantially parallel flats;
- a paddle integrally formed with said body at said second end;
- a stop integrally formed from a bottom flat at said first end;
- a plurality of teeth formed in a top flat, said plurality of teeth adapted to be engaged by the latching mechanism, said second end adapted to be coupled to the other of the seat back and the seat bottom.

11. The recliner rod of claim 10 wherein said top and bottom flats are diametrically opposed and parallel and extend from said first end to said second end.

12. The recliner rod of claim 10 wherein said stop is adapted to engage the housing to limit the travel of said recliner rod relative to the housing.

13. The recliner rod of claim 12 wherein said stop is adapted to engage the housing when the seat is in the fully reclined position.

14. A method of forming a recliner rod for a linear seat recliner for use in a seat having a seat back pivotally connected to a seat bottom, the seat being operable in a plurality of use positions ranging from an upright position to a fully reclined position, the linear seat recliner having a housing coupled to one of the seat back and the seat bottom, the linear recliner mechanism also having a latching mechanism coupled to the housing, the method comprising the steps of:

forming a recliner rod blank having a first end, a second end, and at least three pairs of substantially planar diametrically opposed and parallel flats including a bottom flat substantially parallel to a top flat;

deforming said second end of said blank to define a paddle adapted to be coupled to the other of the seat back and the seat bottom;

deforming said bottom flat at said first end of said blank to define a stop adapted to engage the housing when the seat is in its fully reclined position; and forming a set of teeth on said top flat, said set of teeth adapted to be selectively engageable by the latching mechanism.

15. The method of claim 14 wherein said step of forming said recliner rod blank includes extruding said blank.

16. The method of claim 14 wherein said step of defining top and bottom flats includes coining said body.

* * * * *